J. E. THORNYCROFT.
LIQUID SPRAYER.
APPLICATION FILED DEC. 11, 1908.

982,106. Patented Jan. 17, 1911.

Witnesses
C. P. Wright Jr.
E. R. Peck

Inventor
J. E. Thornycroft
By A. S. Pattison
Atty.

UNITED STATES PATENT OFFICE.

JOHN EDWARD THORNYCROFT, OF CHISWICK, ENGLAND.

LIQUID-SPRAYER.

982,106.  Specification of Letters Patent.  Patented Jan. 17, 1911.

Application filed December 11, 1908. Serial No. 467,033.

*To all whom it may concern:*

Be it known that I, JOHN EDWARD THORNYCROFT, a subject of the King of Great Britain and Ireland, residing at Chiswick, in the county of Middlesex, England, have invented Improvements in Liquid-Sprayers, of which the following is a specification.

This invention relates to sprayers or burners more especially applicable for use with steam generators fired with liquid fuel.

The object of the invention is to provide a simple construction of sprayer or burner in which the co-acting screw threaded portions used for advancing and retracting the orifice controlling plug are, with appropriate modification, adapted to impart the necessary motion to the liquid to cause the same to issue in a very finely divided state. By this means the whole of the liquid is constrained to flow in a helical direction between the movable and stationary screw threads whereby it will be caused to issue from the sprayer in an advantageous manner and regulation of the flow of liquid can be effected by relative movement of the screw threaded parts. Furthermore, by the construction described, the total length of screw thread can be reduced as compared with that of sprayers or burners as hitherto proposed in which separate screw threaded portions are respectively employed to advance and retract the plug and to impart the necessary motion to the liquid.

Figure 1:
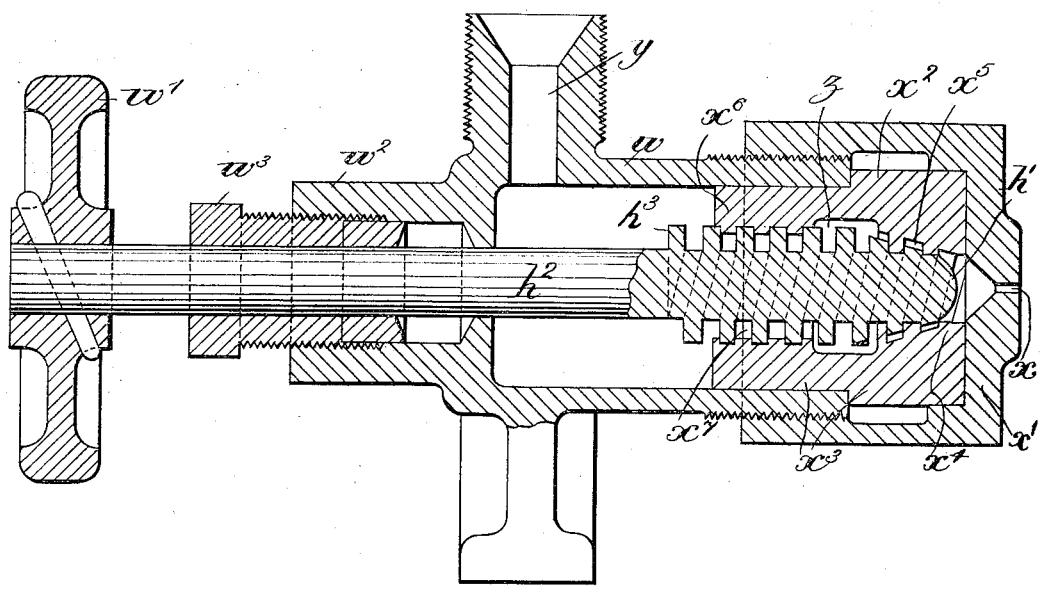
Figure 2:
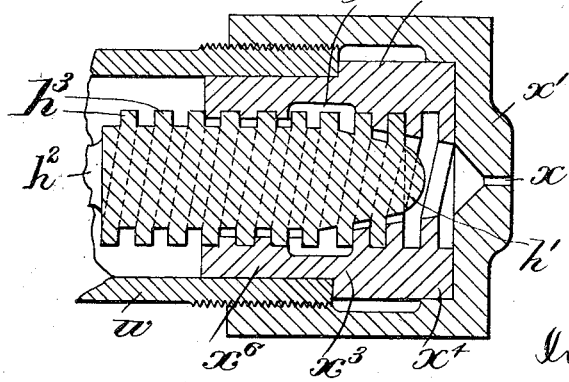

The accompanying drawings illustrate two forms of an oil sprayer or burner, suitable for steam generators, constructed in accordance with the invention, Figure 1 being a complete central longitudinal section and Fig. 2 a partial central longitudinal section.

As shown in Fig. 1, the nozzle plug $h^1$ is constituted by the partially spherical extremity of a spindle $h^2$ adapted to be rotated within the nozzle casing $w$, as by means of a hand wheel $w^1$; $w^2$ is a stuffing box and $w^3$ a gland to secure a tight joint between the spindle $h^2$ and casing $w$. The discharge orifice $x$ of the nozzle is formed in a cap $x^1$ which may be screwed upon the exterior of the casing $w$ and clamps the enlarged portion $x^2$ of a cylindrical block $x^3$ within the casing. The spindle $h^2$ is cut with a single square thread $h^3$ of considerable depth which thread is reduced in diameter externally toward the end constituting the orifice-controlling plug $h^1$. The block $x^3$ is bored at its forward end $x^4$ with an aperture equal in diameter to the smaller diameter of the threaded portion of the spindle $h^2$ and is formed with an internal screw thread the bottom of which is of a diameter diminishing toward the orifice $x$ of the nozzle to correspond more or less with the exterior conical formation of the screw thread $h^3$ on the front end of the spindle $h^2$, so that a spiral passage $x^5$ is formed between these parts when the same are in the positions shown but which can be gradually closed by advancing the spindle, it being preferred that the threads should be cut so that the closure is effected at the extreme front end of the screw threads. The rear portion $x^6$ of the block $x^3$ is formed with a screw thread of lesser depth than the portion of the screw thread $h^3$ engaged therewith, so that a spiral passage $x^7$ is formed enabling the liquid to pass directly from the main inlet $y$ to the spiral passage $x^5$ and issue from such passage with a whirling motion when the spindle $h^2$ is drawn back, the said passage $x^5$ being gradually closed and the supply of liquid reduced and finally cut off upon advancing the spindle. An intermediate chamber $z$ may be provided in the block $x^3$ if desired.

Fig. 2 illustrates a modification in which the screw thread $h^3$ is of uniform external diameter from end to end, the diameter of the bottom of such thread however diminishing from a suitable point in the length toward the partially spherical end $h^1$. In this case the forward part $x^4$ of the block $x^3$ is shaped to correspond more or less to the diminished front end portion of the screw threaded spindle, and both parts $x^4$ and $x^6$ thereof are formed internally with a screw thread the diameter of the bottom of which is uniform from end to end and corresponds with the external diameter of the screw thread $h^5$.

In each case it will be seen that the whole of the liquid passing through the sprayer is constrained to flow through the helical passage formed between the screw threaded parts and issue with a whirling motion; that the cross sectional area of the outlet end of the said passage can be varied to suit requirement; that by screwing the spindle forward, any obstructing matter between the forward portions of the co-acting screw threaded parts can be crushed and by screwing the spindle backward, so as to fully open the said passage, the obstructing matter can be forced out of the sprayer by the liquid.

What I claim is:—

1. A liquid sprayer, comprising relatively movable screw-threaded portions, the screw-threads thereof being arranged to form between them a liquid discharge passage, the threads at the forward end of one of the screw-threaded portions gradually decreasing in distance from the axis of the sprayer.

2. A liquid sprayer, comprising relatively movable screw-threaded portions, the screw-threads thereof forming between them a discharge passage capable of being increased or decreased in size by the relative movement between the screw-threaded portions.

3. A liquid sprayer comprising relatively movable screw-threaded portions, the screw-threads thereof forming between them a liquid discharge passage, adapted to be increased or decreased in size or completely closed by the relative movement of the threaded portions.

4. A liquid sprayer comprising relatively movable screw threaded portions the screw threads whereof form between them a helical liquid discharge passage the forward end portion of which is at a gradually decreasing distance from the axis of the sprayer and is capable of being varied in cross sectional area and of being closed by relative movement of said screw threaded portions.

5. A liquid sprayer comprising relatively movable screw threaded portions the screw threads whereof form between them a helical liquid discharge passage which in part remains of constant cross sectional area and in part varies in cross sectional area with relative movement between the said portions.

6. A liquid sprayer comprising a stationary casing having an internally screw threaded portion and an internally coned discharge end with central liquid discharge orifice, and an orifice controlling plug having a correspondingly screw threaded portion adapted to form in conjunction with the co-acting internally screw threaded portion a helical liquid discharge passage communicating with the discharge orifice and capable of being increased or decreased in size by the relative movement between the screw-threaded portions.

7. A liquid sprayer comprising a stationary casing having internally screw threaded portions and a liquid discharge orifice, a spindle capable of being rotated within the casing, an orifice controlling plug upon the spindle and an exterior screw thread engaging the internally screw threaded portions of the casing and forming therewith a passage part of which increases or diminishes in cross sectional area with rotation of the spindle.

8. A liquid sprayer comprising a stationary casing having a liquid discharge opening and internally screw-threaded portions, and a spindle capable of being rotated within the casing and provided with an external screw-thread engaging the said screw-threaded portions so as to form therewith a passage one portion of which is of constant cross-sectional area and another portion of which is variable in cross-section with relative movement between the screw-threaded portions of the casing and spindle.

9. A liquid sprayer comprising a nozzle casing, a cap having a discharge orifice screwed upon the exterior of the casing, a hollow block clamped to the casing by the cap, a screw thread upon the interior surface of the block, a cylindrical orifice controlling plug extending within the block, a screw thread upon the exterior surface of the plug engaging and forming with the screw thread upon the block a helical discharge passage for the liquid to be sprayed, and a spindle for retracting and advancing the plug with a rotary movement to vary the cross sectional area of the discharge end of the said helical passage.

10. A liquid sprayer, comprising a nozzle casing, a cap having a discharge orifice screwed upon the exterior of the casing, a hollow block clamped to the casing by the cap, having an interior annular chamber intermediate of its length, a screw thread upon the internal surface of the block, a cylindrical orifice controlling plug extending within the block, a screw thread upon the exterior surface of the plug engaging and forming with the screw thread upon the block a helical discharge passage for the liquid to be sprayed, and a spindle for retracting and advancing the plug with a rotary movement to vary the cross sectional area of the discharge end of the helical passage.

11. A liquid sprayer comprising a spindle cut with a square thread that is reduced in diameter externally toward one end, a stationary casing having a discharge orifice and internal cylindrical portions of different diameter, one of which is equal in diameter to the smaller diameter of the threaded portion of the spindle and the other portion is larger in diameter than the said smaller diameter of the threaded portion of the spindle but less than the greatest diameter of the thread on the spindle, an internal screw thread formed in one of the said cylindrical portions and the bottom of which is of uniform diameter throughout its length, and an internal screw thread formed in the other cylindrical portion the bottom of which is of a diameter diminishing toward the orifice of the nozzle, and means for advancing and retracting the spindle in its casing.

12. A liquid sprayer, comprising a stationary casing having a discharge orifice and internally screw-threaded portions divided by an interior annular chamber, a spindle cut with a thread that is reduced in diameter externally toward one end, the threads of the casing in front of the chamber being equal in diameter to the smaller diameter of the threaded portion of the spindle and the threads on the part in the rear of the chamber being larger than such diameter but less than the greatest diameter of the thread of the spindle.

13. A liquid sprayer comprising a spindle cut with a square thread that is reduced in diameter externally toward one end, a nozzle casing, a cap screwed to the casing and having a discharge orifice, a hollow block clamped to the casing by the cap, part of the internal portion of which block is equal in diameter to the smaller diameter of the threaded portion of the spindle and another part of the internal portion of the block is larger in diameter than the said smaller diameter of the threaded portion of the spindle but less than the greatest diameter of the thread on the spindle, separate internal screw threads formed in the said internal portions of the block, the bottom of one of the internal screw threads being of uniform diameter and the bottom of the other internal screw thread being of a diameter diminishing toward the orifice in the nozzle cap, and means for advancing and retracting the spindle in its casing.

14. A liquid sprayer comprising a spindle cut with a square thread that is reduced in diameter externally toward one end, a nozzle casing, a cap screwed to the casing and having a discharge orifice, a hollow block clamped to the casing by the cap, part of the internal portion of which block is cylindrical and equal in diameter to the smaller diameter of the threaded portion of the spindle and part is larger than such smaller diameter of the threaded portion of the spindle but less than the greatest diameter of the thread on the spindle, an interior annular chamber intermediate of the two parts of different diameter, separate internal screw threads formed in the said two parts of different diameter, the bottom of one of the internal screw threads being of uniform diameter and the bottom of the other internal screw thread being of a diameter diminishing toward the orifice in the nozzle cap, and means for advancing and retracting the spindle in its casing.

15. A liquid sprayer comprising a spindle cut with a square thread that is reduced in diameter externally toward one end, a nozzle casing, a cap secured to the casing and having a discharge orifice, a hollow block clamped to the casing by the cap, part of the internal portion of which block is cylindrical and equal in diameter to the smaller diameter of the threaded portion of the spindle and part is cylindrical and larger than such diameter but less than the greatest diameter of the thread of the spindle, an internal thread formed in said block and interrupted intermediate its ends and diminishing toward the orifice in the nozzle cap, and means for turning said spindle in the casing.

16. A liquid sprayer comprising a spindle cut with a square thread that is reduced in diameter externally toward one end, a nozzle casing inclosing said spindle, a cap screwed to the casing and having a discharge orifice, a hollow block clamped to the end of the casing by said cap and having a part of its internal portion cylindrical and screw-threaded and equal in diameter to the smaller diameter of the threaded portion of the spindle and another part screw-threaded and larger than such diameter but less than the greatest diameter of the threads of the spindle, the threads formed on said block being interrupted intermediate the ends of the block and the bottom of said threads diminishing in diameter toward the orifice in the nozzle cap, a stuffing box carried by the opposite end of the casing and through which the spindle passes, means for turning the spindle, and a nipple carried by the casing for attaching the oil supply pipe.

Signed at London England this 27th day of November 1908.

JOHN EDWARD THORNYCROFT.

Witnesses:
 WM. R. SEWARD,
 JNO. T. CHERRY.